United States Patent
Yang et al.

(10) Patent No.: US 10,148,110 B2
(45) Date of Patent: Dec. 4, 2018

(54) CHARGING DEVICE AND CONTROL METHOD FOR CONTROLLING OPERATIONS OF DIFFERENT MODULATION MODULES ACCORDING TO LOAD CONDITIONS

(71) Applicant: COMPAL ELECTRONICS, INC., Taipei (TW)

(72) Inventors: Yaun-Ren Yang, Taipei (TW); Chia-Ning Yang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 77 days.

(21) Appl. No.: 15/411,564

(22) Filed: Jan. 20, 2017

(65) Prior Publication Data

US 2018/0062406 A1   Mar. 1, 2018

(30) Foreign Application Priority Data

Aug. 24, 2016   (TW) .............................. 105127031 A

(51) Int. Cl.
    *H02J 7/00*   (2006.01)
(52) U.S. Cl.
    CPC ..... *H02J 7/0052* (2013.01); *H02J 2007/0059* (2013.01)
(58) Field of Classification Search
    CPC ........................ H02J 7/0052; H02J 2007/0059
    See application file for complete search history.

(56) References Cited

U.S. PATENT DOCUMENTS

| 6,714,425 B2 | 3/2004 | Yamada et al. | |
|---|---|---|---|
| 7,408,333 B2* | 8/2008 | Chen | H02M 3/157 323/282 |
| 7,622,898 B2* | 11/2009 | Shimizu | H02J 7/0016 320/166 |
| 8,098,501 B2* | 1/2012 | Sonobe | H02M 1/36 323/284 |

(Continued)

FOREIGN PATENT DOCUMENTS

| TW | I302396 | 10/2008 |
|---|---|---|
| TW | I374606 | 10/2012 |

(Continued)

*Primary Examiner* — Naum B Levin
(74) *Attorney, Agent, or Firm* — Kirton McConkie; Evan R. Witt

(57) ABSTRACT

A charging device and a control method for the charging device are provided. The charging device includes an AC/DC converting circuit and a main controller. The main controller includes a first modulation module and a second modulation module. The operation of the switching circuit controlled by the second modulation module consumes less amount of electric energy than the operation of the switching circuit controlled by the first modulation module. When the charging device is in the heavy load condition, the first modulation module is enabled to control the operation of the switching circuit. When the charging device is in the light load condition or the no load condition, the second modulation module is enabled to control the operation of the switching circuit. Consequently, the power consumption of the charging device in the light load condition or the no load condition is reduced.

15 Claims, 9 Drawing Sheets

(56) References Cited

U.S. PATENT DOCUMENTS

| | | | | |
|---|---|---|---|---|
| 8,411,468 | B2* | 4/2013 | Lalithambika | H02M 1/08 |
| | | | | 363/21.02 |
| 8,569,975 | B2* | 10/2013 | Uchimoto | G09G 3/3406 |
| | | | | 315/210 |
| 9,024,613 | B2* | 5/2015 | Murata | H02M 3/33507 |
| | | | | 323/285 |
| 9,112,407 | B2* | 8/2015 | Hou | H02M 1/14 |
| 9,692,297 | B2* | 6/2017 | Archibald | H02M 3/156 |
| 9,825,485 | B2* | 11/2017 | Lee | H02J 7/025 |
| 2005/0110465 | A1* | 5/2005 | Tanishita | H02J 7/0047 |
| | | | | 320/141 |
| 2008/0186004 | A1* | 8/2008 | Williams | H01L 29/8128 |
| | | | | 323/282 |
| 2009/0079408 | A1* | 3/2009 | Qiao | H02M 3/157 |
| | | | | 323/283 |
| 2011/0273104 | A1* | 11/2011 | Uchimoto | G09G 3/3406 |
| | | | | 315/210 |
| 2012/0091970 | A1* | 4/2012 | Cho | H02J 7/022 |
| | | | | 320/160 |
| 2015/0194880 | A1* | 7/2015 | Wibben | H02M 3/156 |
| | | | | 323/282 |
| 2016/0372957 | A1* | 12/2016 | Blakely | H02J 50/80 |
| 2017/0117730 | A1* | 4/2017 | Kim | H02J 7/0052 |
| 2017/0187200 | A1* | 6/2017 | Somerville | H02J 7/0052 |

FOREIGN PATENT DOCUMENTS

| | | |
|---|---|---|
| TW | I377772 | 11/2012 |
| TW | I413338 | 10/2013 |

* cited by examiner

| | Conduction current | Feedback current | Bandwidth of the first control signal |
|---|---|---|---|
| Heavy load condition | Level 1 | Level 3 | Level 1 |
| Light load condition | Level 2 | Level 2 | Level 2 |
| No load condition | Level 3 | Level 1 | Level 3 |

FIG. 3

| | Conduction current | Feedback current | Frequency of the second control signal |
|---|---|---|---|
| Heavy load condition | Level 1 | Level 3 | Level 1 |
| Light load condition | Level 2 | Level 2 | Level 2 |
| No load condition | Level 3 | Level 1 | Level 3 |

FIG. 4

|  | Conduction Feedback current | Bandwidth of the second control signal | Frequency of the second control signal |
|---|---|---|---|
| Heavy load condition | Level 1 | Level 1 | Level 1 |
| Light load condition | Level 2 | Level 2 | Level 2 |
| No load condition | Level 3 | Level 3 | Level 3 |

FIG. 5

|  | Conduction current | Feedback current | Bandwidth of the second control signal | Frequency of the second control signal |
|---|---|---|---|---|
| PFM circuit | Level 1 | Level 1 | Level 1 | Level 1 |
| AM circuit | Level 2 | Level 2 | Level 2 | Level 2 |
| GM modulation circuit | Level 3 | Level 3 | Level 3 | Level 3 |

FIG. 6

```
                    ┌─────────────────────────────────┐
                    │ The operation of the switching  │
                    │ circuit is controlled according │
                    │ to a first control signal or a  │
                    │ second control signal, and thus │──── S1
                    │ the AC/DC converting circuit    │
                    │ converts an AC input power into │
                    │ a DC output power and generates │
                    │ plural parameter signals        │
                    │ corresponding to the DC output  │
                    │ power.                          │
                    └─────────────────────────────────┘
                                   │
                                   ▼
                    ┌─────────────────────────────────┐
                    │ The switch control circuit      │
                    │ enters a condition control      │
                    │ mode, and the switch control    │
                    │ circuit judges whether a load   │
                    │ condition of the charging       │
                    │ device is maintained or changed │──── S2
                    │ to a heavy load condition, a    │
                    │ light load condition or a no    │
                    │ load condition according to the │
                    │ plural parameter signals and    │
                    │ the first control signal or the │
                    │ second control signal.          │
                    └─────────────────────────────────┘
                                   │
                                   ▼
                    ┌─────────────────────────────────┐
                    │ The first modulation module is  │
                    │ enabled and the second          │
                    │ modulation module is disabled   │
                    │ if the switch control circuit   │
                    │ judges that the load condition  │
                    │ of the charging device is in    │
                    │ the heavy load condition, and   │──── S3
                    │ the first modulation module is  │
                    │ disabled and the second         │
                    │ modulation module is enabled    │
                    │ if the switch control circuit   │
                    │ judges that the load condition  │
                    │ of the charging device is in    │
                    │ the light load condition or the │
                    │ no load condition.              │
                    └─────────────────────────────────┘
```

FIG. 9

CHARGING DEVICE AND CONTROL METHOD FOR CONTROLLING OPERATIONS OF DIFFERENT MODULATION MODULES ACCORDING TO LOAD CONDITIONS

FIELD OF THE INVENTION

The present invention relates to a charging device, and more particularly to a charging device and a control method for controlling operations of different modulation modules according to the load conditions.

BACKGROUND OF THE INVENTION

Nowadays, electronic devices such as mobile phones, tablet phones and notebook computers become essential to daily lives. Consequently, the demands on charging performance and power-saving efficacy gradually increase. After the electronic device is fully charged by a charging device, the charging device is in a no load condition. In the no load condition, the charging device is operated at a lowest voltage. Once the electronic device is charged by the charging device again, the charging device can enter a charging state quickly because of the lowest voltage.

Generally, the electronic device is charged by the charging device through a USB2.0 interface. According to the specification of the USB2.0 interface, the output power voltage in the no load condition is in the range between 4.75V and 5.25V. Consequently, the lowest voltage of the charging device in the no load condition is set to be in the range between 4.75V and 5.25V.

A conventional charging device comprises a pulse width modulation (PWM) circuit and an AC/DC converting circuit. When the charging device is in a heavy load condition or a light load condition, the PWM circuit is used to control the output voltage of the AC/DC converting circuit. When the charging device is in the no load condition, PWM circuit is also used to control the output voltage of the AC/DC converting circuit to be in the range between 4.75V and 5.25V.

The use of the PWM circuit to control the output voltage of the AC/DC converting circuit can reduce the ripple of the output voltage. Moreover, the modulation efficiency of the PWM circuit is also satisfied. Consequently, the PWM circuit is often used to control the output voltage of the AC/DC converting circuit when the charging device is in the heavy load condition.

However, when the charging device is in the no load condition, the power-saving efficacy should be taken into consideration. That is, the lowest voltage of the charging device in the no load condition is set to be in the range between 4.75V and 5.25V. In addition, the charging device in the no load condition has to achieve the power-saving purpose. When the conventional device in the light load condition or the no load condition, the PWM circuit is used to control the output voltage of the AC/DC converting circuit to be in the range between 4.75V and 5.25V. According to the control signal from the PWM circuit, the switch elements of the AC/DC converting circuit are alternately turned on or turned off. Because of the frequent switching actions of the switching elements, the charging device in the no load condition consumes a great amount of electric energy.

Therefore, there is a need of providing a charging device and a control method in order to overcome the drawbacks of the conventional technologies.

SUMMARY OF THE INVENTION

An object of the present invention provides a charging device and a control method for increasing the power-saving efficiency when the charging device is in a light load condition or a no load condition.

In accordance with an aspect of the present invention, there is provided a charging device. The charging device includes an AC/DC converting circuit and a main controller. The AC/DC converting circuit includes a switching circuit. During an operation of the switching circuit, the AC/DC converting circuit converts an AC input power into a DC output power and generates plural parameter signals corresponding to the DC output power. The main controller is electrically connected with the AC/DC converting circuit for controlling the AC/DC converting circuit. The main controller includes a switch control circuit, a first modulation module and a second modulation module. The first modulation module generates a first control signal to control the switching circuit when the first modulation module is enabled. The second modulation module generates a second control signal to control the switching circuit when the second modulation module is enabled. A first end of the switch control circuit is electrically connected with the switching circuit. A second end of the switch control circuit is electrically connected with the first modulation module and the second modulation module. The switch control circuit selectively enables the first modulation module or the second modulation module to generate the first control signal or the second control signal to the switching circuit. The operation of the switching circuit according to the second control signal consumes less amount of electric energy than the operation of the switching circuit according to the first control signal. When the switch control circuit is operated in a condition control mode, the switch control circuit judges whether a load condition of the charging device is maintained in or changed to a heavy load condition, a light load condition or a no load condition according to the plural parameter signals and the first control signal or the second control signal. If the switch control circuit judges that the load condition of the charging device is in the heavy load condition, the switch control circuit enables the first modulation module and disables the second modulation module. If the switch control circuit judges that the load condition of the charging device is in the light load condition or the no load condition, the switch control circuit disables the first modulation module and enables the second modulation module.

In accordance with another aspect of the present invention, there is provided a control method for a charging device. The charging device includes an AC/DC converting circuit and a main controller. The AC/DC converting circuit includes a switching circuit. The main controller is electrically connected with the AC/DC converting circuit. The main controller includes a switch control circuit, a first modulation module and a second modulation module. The first modulation module generates a first control signal to control an operation of the switching circuit when the first modulation module is enabled. The second modulation module generates a second control signal to control the operation of the switching circuit when the second modulation module is enabled. A first end of the switch control circuit is electrically connected with the switching circuit. A second end of the switch control circuit is electrically connected with the first modulation module and the second modulation module. The switch control circuit selectively enables the first modulation module or the second modulation module to generate the first control signal or the second control signal to the switching circuit. The operation of the switching circuit according to the second control signal consuming less amount of electric energy than the operation of the switching circuit according to the first control signal. The control method includes the following steps. Firstly, the operation of the switching circuit is controlled according to the first control signal or the second control signal. Consequently, the AC/DC converting circuit converts an AC input power into a DC output power and generates plural parameter signals corresponding to the DC output power. Then, the switch control circuit enters a condition control mode. In the condition control mode, the switch control circuit judges whether a load condition of the charging device is maintained in or changed to a heavy load condition, a light load condition or a no load condition according to the plural parameter signals and the first control signal or the second control signal. If the switch control circuit judges that the load condition of the charging device is in the heavy load condition, the first modulation module is enabled and the second modulation module is disabled. If the switch control circuit judges that the load condition of the charging device is in the light load condition or the no load condition, the first modulation module is disabled and the second modulation module is enabled.

The above contents of the present invention will become more readily apparent to those ordinarily skilled in the art after reviewing the following detailed description and accompanying drawings, in which:

BRIEF DESCRIPTION OF THE DRAWINGS

FIG. 3 schematically illustrates a first condition judgment table for judging whether the loading condition of the charging device is kept unchanged or changed when the loading condition of the charging device is in the heavy load condition;

FIG. 4 schematically illustrates a second condition judgment table for judging whether the loading condition of the charging device is kept unchanged or changed when the loading condition of the charging device is in the light load condition;

FIG. 5 schematically illustrates a third condition judgment table for judging whether the loading condition of the charging device is kept unchanged or changed when the loading condition of the charging device is in the no load condition;

FIG. 6 schematically illustrating an activation judgment table in the switch control circuit;

FIG. 9 is a flowchart of a control method for a charging device according to an embodiment of the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
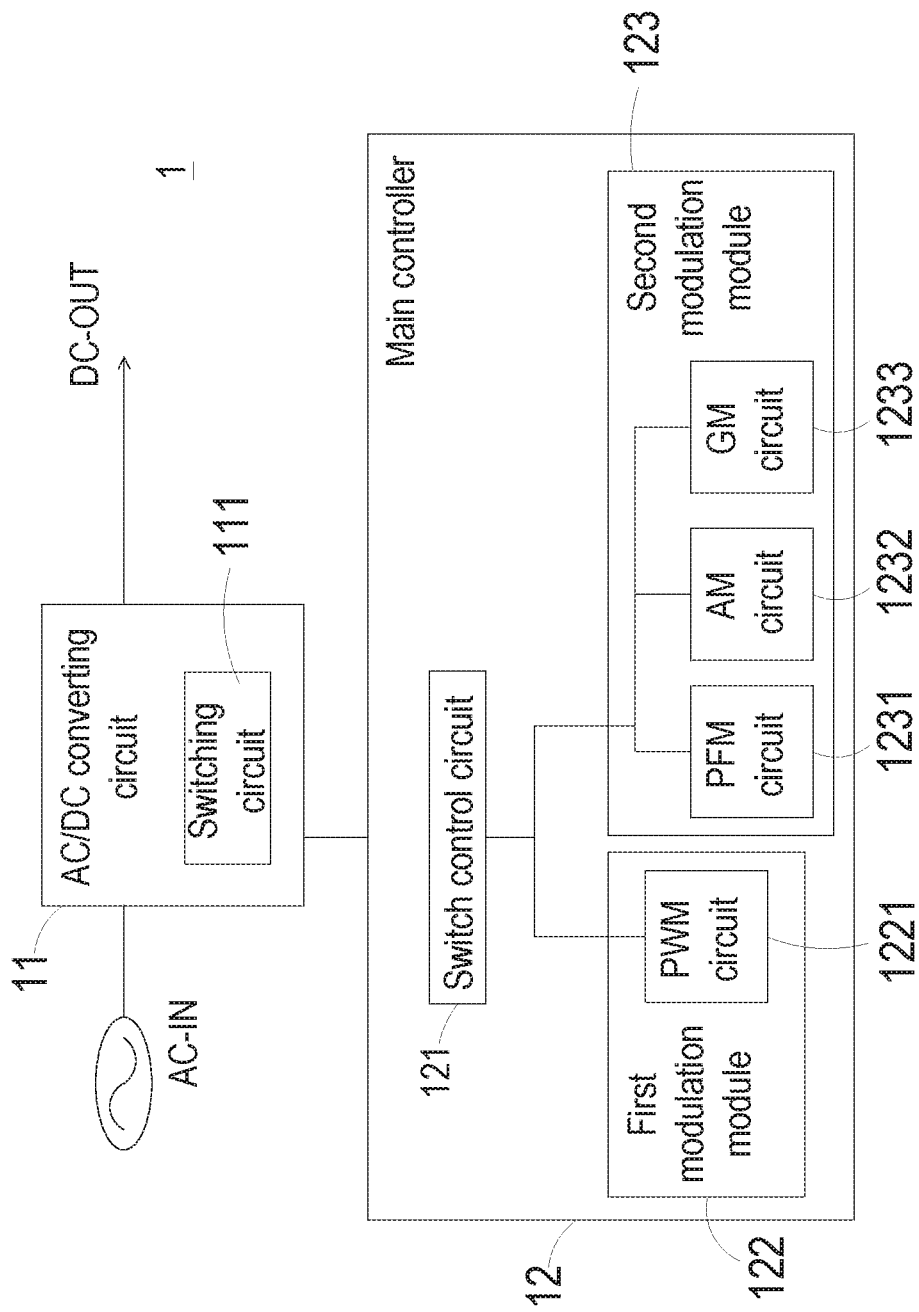
FIG. 1 is a schematic circuit diagram illustrating a charging device according to a first embodiment of the present invention.

FIG. 1 is a schematic circuit diagram illustrating a charging device according to a first embodiment of the present invention. The charging device 1 is used to charge a load (not shown). As shown in FIG. 1, the charging device 1 comprises an AC/DC converting circuit 11 and a main controller 12. The AC/DC converting circuit 11 receives AC input power AC-IN and converts the AC input power AC-IN into DC output power DC-OUT. During the operation of the AC/DC converting circuit 11, plural parameter signals associated with the DC output power DC-OUT are generated. The AC/DC converting circuit 11 comprises a switching circuit 111. By alternately turning on or turning off the switching circuit 111, the AC/DC converting circuit 11 converts the AC input power AC-IN into the DC output power DC-OUT.

The plural parameter signals are related to the operating condition of the charging device 1. For example, the operating condition of the charging device 1 includes a heavy load condition, a light load condition or a no load condition.

The main controller 12 is electrically connected with the switching circuit 111 of the AC/DC converting circuit 11. The switching circuit 111 is alternately turned on or turned off under control of the main controller 12. In this embodiment, the switching circuit 111 comprises a switch control circuit 121, a first modulation module 122 and a second modulation module 123.

The first modulation module 122 is electrically connected with the switch control circuit 121. During operation, the first modulation module 122 generates a first control signal. The switching circuit 111 is alternately turned on or turned off according to the first control signal. In this embodiment, the first modulation module 122 comprises a pulse width modulation (PWM) circuit 1221. The PWM circuit 1221 is electrically connected with the switch control circuit 121. During operation of the first modulation module 122, the PWM circuit 1221 generates the first control signal. In other words, the first control signal is a PWM signal.

The second modulation module 123 is electrically connected with the switch control circuit 121. During operation, the second modulation module 123 generates a second control signal. The switching circuit 111 is alternately turned on or turned off according to the second control signal. In this embodiment, the second modulation module 123 comprises a pulse frequency modulation (PFM) circuit 1231, an amplitude modulation (AM) circuit 1232 and a green mode (GM) modulation circuit 1233. The pulse frequency modulation circuit 1231, the amplitude modulation circuit 1232 and the green mode modulation circuit 1233 are electrically connected with the switch control circuit 121. During operation of the second modulation module 123, the second control signal is selectively generated by the pulse frequency modulation circuit 1231, the amplitude modulation circuit 1232 or the green mode modulation circuit 1233. In case that the second control signal is generated by the pulse frequency modulation circuit 1231, the second control signal is a PFM signal. In case that the second control signal is generated by the amplitude modulation circuit 1232, the second control signal is an AM signal. In case that the second control signal is generated by the green mode modulation circuit 1233, the second control signal is a GM signal.

The operating principles and circuitry configurations of the pulse width modulation (PWM) circuit 1221, the pulse frequency modulation circuit 1231, the amplitude modulation circuit 1232 or the green mode modulation circuit 1233 are well known to those skilled in the art, and are not redundantly described herein. The operations of the pulse width modulation (PWM) circuit 1221, the pulse frequency modulation circuit 1231, the amplitude modulation circuit 1232 and the green mode modulation circuit 1233 are different. The power consumption of the switching circuit 111 according to the second control signal (i.e., from the pulse frequency modulation circuit 1231, the amplitude modulation circuit 1232 or the green mode modulation circuit 1233) is lower than the power consumption of the switching circuit 111 according to the first control signal (i.e., from the PWM circuit 1221).

A first end of the switch control circuit 121 is electrically connected with the switching circuit 111. A second end of the switch control circuit 121 is electrically connected with the PWM circuit 1221 of the first modulation module 122 and the pulse frequency modulation circuit 1231, the amplitude modulation circuit 1232 and the green mode modulation circuit 1233 of the second modulation module 123. The first modulation module 122 or the second modulation module 123 is selectively enabled to generate the first control signal or the second control signal to the switching circuit 111 under control of the switch control circuit 121.

The switch control circuit 121 is selectively operated in an initial control mode or a condition control mode. After the charging device 1 is turned on, the switch control circuit 121 is in the initial control mode. In the initial control mode, the switch control circuit 121 sets a default load condition of the charging device 1 to be one of the heavy load condition, the light load condition and the no load condition. If the default load condition of the charging device 1 is the heavy load condition, the first modulation module 122 is enabled under control of the switch control circuit 121. If the default load condition of the charging device 1 is the light load condition or the no load condition, the second modulation module 123 is enabled under control of the switch control circuit 121. Preferably, the default load condition of the charging device 1 is the heavy load condition when the switch control circuit 121 is in the initial control mode.

After the procedure in the initial control mode is completed, the switch control circuit 121 is operated in the condition control mode. In the condition control mode, the switch control circuit 121 samples the plural parameter signals and samples the first control signal or the second control signal. Moreover, the switch control circuit 121 judges whether the load condition of the charging device 1 is in the heavy load condition, the light load condition or the no load condition according to the first control signal or the second control signal. If the switch control circuit 121 judges that the load condition of the charging device 1 is in the heavy load condition, the switch control circuit 121 enables the first modulation module 122 and disables the second modulation module 123. Since the PWM circuit 1221 is enabled, the PWM circuit 1221 issues the first control signal to the switching circuit 111. According to the first control signal, the switching circuit 111 is alternately turned on or turned off. If the switch control circuit 121 judges that the load condition of the charging device 1 is in the light load condition or the no load condition, the switch control circuit 121 enables the second modulation module 123 and disables the first modulation module 122. Consequently, one of the pulse frequency modulation circuit 1231, the amplitude modulation circuit 1232 and the green mode modulation circuit 1233 is enabled. At the same time, the second control signal generated by the pulse frequency modulation circuit 1231 (i.e., the PFM signal), the second control signal generated by the amplitude modulation circuit 1232 (i.e., the AM signal) or the second control signal generated by the green mode modulation circuit 1233 (i.e., the GM signal) is transmitted to the switching circuit 111. According to the second control signal, the switching circuit 111 is alternately turned on or turned off.

As mentioned above, the use of the PWM circuit 1221 to control the DC output voltage DC-OUT of the AC/DC converting circuit 11 can reduce the ripple of the DC output voltage DC-OUT. Moreover, the modulation efficiency of the PWM circuit 1221 is also satisfied. When the charging device 1 is in the heavy load condition, the first modulation module 122 is enabled and the PWM circuit 1221 controls the operation of the switching circuit 111 of the AC/DC converting circuit 11. Moreover, the power consumption of the switching circuit 111 according to the second control signal (i.e., from the pulse frequency modulation circuit 1231, the amplitude modulation circuit 1232 or the green mode modulation circuit 1233) is lower than the power consumption of the switching circuit 111 according to the first control signal (i.e., from the PWM circuit 1221). Consequently, when the charging device 1 is in the light load condition or the no load condition, the second modulation module 123 is enabled. Since one of the pulse frequency modulation circuit 1231, the amplitude modulation circuit 1232 and the green mode modulation circuit 1233 is enabled to control the operation of the switching circuit 111, the power consumption of the charging device 1 in the light load condition or the no load condition is reduced.

Figure 2:
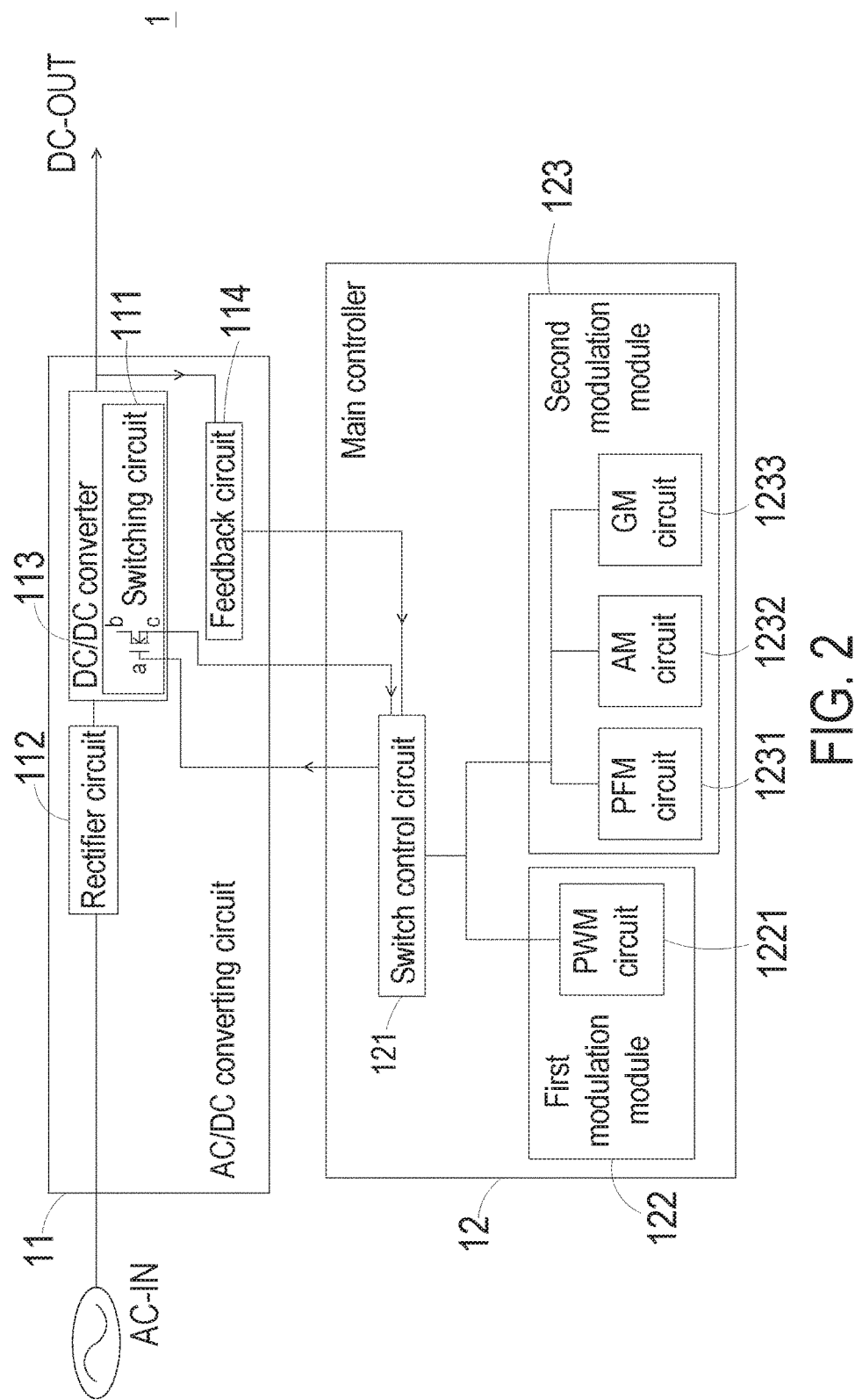
FIG. 2 is a schematic detailed circuit diagram of the charging device of FIG. 1.

FIG. 2 is a schematic detailed circuit diagram of the charging device of FIG. 1. As shown in FIG. 2, the AC/DC converting circuit 11 further comprises a rectifier circuit 112, a DC/DC converter 113 and a feedback circuit 114. The rectifier circuit 112 receives the AC input power AC-IN and converts the AC input power AC-IN into transition DC power. The DC/DC converter 113 is electrically connected with the rectifier circuit 112. After the voltage level of the transition DC power is adjusted by the DC/DC converter 113, the DC output power DC-OUT is outputted from the DC/DC converter 113.

The switching circuit 111 is included in the DC/DC converter 113. By alternately turning on/off the switching circuit 111, the DC/DC converter 113 converts the transition DC power into the DC output power DC-OUT. In an embodiment, the switching circuit 111 comprises a transistor such as a metal-oxide-semiconductor field-effect transistor (MOSFET). The switching circuit 111 comprises a control terminal "a", a first conduction terminal "b" and a second conduction terminal "c". The control terminal "a" is electrically connected with the switch control circuit 121 for receiving the first control signal or the second control signal. According to the first control signal or the second control signal, the path between the first conduction terminal "b" and the second conduction terminal "c" is conducted or shut off. When the path between the first conduction terminal "b" and the second conduction terminal "c" is conducted, a conduction current flows through the first conduction terminal "b" and the second conduction terminal "c".

The feedback circuit 114 is electrically connected with the switch control circuit 121 and the AC/DC converting circuit 11. When the AC/DC converting circuit 11 outputs the DC output power DC-OUT, a feedback current corresponding to the DC output power DC-OUT is outputted from the feedback circuit to the switch control circuit 121. An example of the feedback circuit 114 includes but is not limited to an optical coupler.

In an embodiment, the plural parameter signals include the conduction current and the feedback current.

In case that the first modulation module 122 is enabled to generate the first control signal, the switch control circuit 121 acquires the information about the bandwidth and the frequency of the first control signal. In case that the second modulation module 123 is enabled to generate the second control signal, the switch control circuit 121 acquires the information about the bandwidth and the frequency of the second control signal.

Moreover, a first condition judgment table, a second condition judgment table and a third condition judgment table have been previously stored in the switch control circuit 121. The first condition judgment table records the relationships between the load condition of the charging device (e.g., the heavy load condition, the light load condition or the no load condition), the parameter signals (e.g., the conduction current and the feedback current) and the bandwidth of the first control signal. The second condition judgment table records the relationships between the load condition of the charging device (e.g., the heavy load condition, the light load condition or the no load condition), the parameter signals (e.g., the conduction current and the feedback current) and the frequency of the second control signal. The third condition judgment table records the relationships between the load condition of the charging device (e.g., the heavy load condition, the light load condition or the no load condition), the parameter signals (e.g., the conduction current and the feedback current), the bandwidth of the second control signal and the frequency of the second control signal.

The present invention further provides a strategy of judging whether the loading condition of the charging device 1 is kept unchanged or changed. If the charging device 1 is in the heavy load condition, the switch control circuit 121 judges whether the load condition of the charging device 1 is maintained in the heavy load condition or changed to the light load condition or the no load condition according to the conduction current, the feedback current and the bandwidth of the first control signal and according to the first condition judgment table. If the charging device 1 is in the light load condition, the switch control circuit 121 judges whether the load condition of the charging device 1 is maintained in the light load condition or changed to the heavy load condition or the no load condition according to the conduction current, the feedback current and the frequency of the second control signal and according to the second condition judgment table. If the charging device 1 is in the no load condition, the switch control circuit 121 judges whether the load condition of the charging device 1 is maintained in the no load condition or changed to the heavy load condition or the light load condition according to the conduction current, the feedback current, the bandwidth of the second control signal and the frequency of the second control signal and according to the third condition judgment table.

FIG. 3 schematically illustrates a first condition judgment table for judging whether the loading condition of the charging device is kept unchanged or changed when the loading condition of the charging device is in the heavy load condition. When the charging device 1 is in the heavy load condition, the switch control circuit 121 uses the first condition judgment table to judge whether the load condition of the charging device 1 is maintained in the heavy load condition or changed to the light load condition or the no load condition. In the first condition judgment table, the magnitudes of the conduction current are classified into a first conduction current level (Level 1), a second conduction current level (Level 2) and a third conduction current level (Level 3). The first conduction current level is higher than the second conduction current level, and the second conduction current level is higher than the third conduction current level. In the first condition judgment table, the magnitudes of the feedback current are classified into a first feedback current level (Level 1), a second feedback current level (Level 2) and a third feedback current level (Level 3). The first feedback current level is higher than the second feedback current level, and the second feedback current level is higher than the third feedback current level. In the first condition judgment table, the magnitudes of the bandwidth of the first control signal are classified into a first bandwidth level (Level 1), a second bandwidth level (Level 2) and a third bandwidth level (Level 3). The first bandwidth level is higher than the second bandwidth level, and the second bandwidth level is higher than the third bandwidth level.

In other words, when the switch control circuit 121 is in the condition control mode and the charging device 1 is in the heavy load condition, the switch control circuit 121 uses the first condition judgment table to judge whether the load condition of the charging device 1 is maintained in the heavy load condition or changed to the light load condition or the no load condition. If the conduction current is in Level 1, the feedback current is in Level 3 and the bandwidth of the first control signal is in Level 1, the switch control circuit 121 judges that the load condition of the charging device 1 is maintained in the heavy load condition. If the conduction current is in Level 2, the feedback current is in Level 2 and the bandwidth of the first control signal is in Level 2, the switch control circuit 121 judges that the load condition of the charging device 1 is changed to the light load condition. If the conduction current is in Level 3, the feedback current is in Level 1 and the bandwidth of the first control signal is in Level 3, the switch control circuit 121 judges that the load condition of the charging device 1 is changed to the no load condition. After the load condition of the charging device 1 is judged, the switch control circuit 121 selectively enables the first modulation module 122 or the second modulation module 123.

When the switch control circuit 121 is in the condition control mode and the magnitudes of the conduction current, the feedback current and the bandwidth of the first control signal comply none of the heavy load condition, the light load condition and the no load condition of the first condition judgment table, the switch control circuit 121 judges that the load condition of the charging device 1 is unchanged. For example, if the conduction current is in Level 1, the feedback current is in Level 1 and the bandwidth of the first control signal is in Level 1, the switch control circuit 121 judges that the load condition of the charging device 1 is unchanged. Under this circumstance, the operation of the switch control circuit 121 is not changed.

FIG. 4 schematically illustrates a second condition judgment table for judging whether the loading condition of the charging device is kept unchanged or changed when the loading condition of the charging device is in the light load condition. When the charging device 1 is in the light load condition, the switch control circuit 121 uses the second condition judgment table to judge whether the load condition of the charging device 1 is maintained in the light load condition or changed to the heavy load condition or the no load condition. In the second condition judgment table, the magnitudes of the conduction current are classified into a first conduction current level (Level 1), a second conduction current level (Level 2) and a third conduction current level (Level 3). The first conduction current level is higher than the second conduction current level, and the second conduction current level is higher than the third conduction current level. In the second condition judgment table, the magnitudes of the feedback current are classified into a first feedback current level (Level 1), a second feedback current level (Level 2) and a third feedback current level (Level 3). The first feedback current level is higher than the second feedback current level, and the second feedback current level is higher than the third feedback current level. In the second condition judgment table, the magnitudes of the frequency of the second control signal are classified into a first frequency level (Level 1), a second frequency level (Level 2) and a third frequency level (Level 3). The first frequency level is higher than the second frequency level, and the second frequency level is higher than the third frequency level.

In other words, when the switch control circuit 121 is in the condition control mode and the charging device 1 is in the light load condition, the switch control circuit 121 uses the second condition judgment table to judge whether the load condition of the charging device 1 is maintained in the light load condition or changed to the heavy load condition or the no load condition. If the conduction current is in Level 1, the feedback current is in Level 3 and the frequency of the second control signal is in Level 1, the switch control circuit 121 judges that the load condition of the charging device 1 is changed to the heavy load condition. If the conduction current is in Level 2, the feedback current is in Level 2 and the frequency of the second control signal is in Level 2, the switch control circuit 121 judges that the load condition of the charging device 1 is maintained in the light load condition. If the conduction current is in Level 3, the feedback current is in Level 1 and the frequency of the second control signal is in Level 3, the switch control circuit 121 judges that the load condition of the charging device 1 is changed to the no load condition. After the load condition of the charging device 1 is judged, the switch control circuit 121 selectively enables the first modulation module 122 or the second modulation module 123.

When the switch control circuit 121 is in the condition control mode and the magnitudes of the conduction current, the feedback current and the frequency of the second control signal comply none of the heavy load condition, the light load condition and the no load condition of the second condition judgment table, the switch control circuit 121 judges that the load condition of the charging device 1 is unchanged. For example, if the conduction current is in Level 1, the feedback current is in Level 1 and the frequency of the second control signal is in Level 1, the switch control circuit 121 judges that the load condition of the charging device 1 is unchanged. Under this circumstance, the operation of the switch control circuit 121 is not changed.

FIG. 5 schematically illustrates a third condition judgment table for judging whether the loading condition of the charging device is kept unchanged or changed when the loading condition of the charging device is in the no load condition. When the charging device 1 is in the no load condition, the switch control circuit 121 uses the third condition judgment table to judge whether the load condition of the charging device 1 is maintained in the no load condition or changed to the heavy load condition or the light load condition. In the third condition judgment table, the magnitudes of the conduction current are classified into a first conduction current level (Level 1), a second conduction current level (Level 2) and a third conduction current level (Level 3). The first conduction current level is higher than the second conduction current level, and the second conduction current level is higher than the third conduction current level. In the third condition judgment table, the magnitudes of the feedback current are classified into a first feedback current level (Level 1), a second feedback current level (Level 2) and a third feedback current level (Level 3). The first feedback current level is higher than the second feedback current level, and the second feedback current level is higher than the third feedback current level. In the third condition judgment table, the magnitudes of the bandwidth of the second control signal are classified into a first bandwidth level (Level 1), a second bandwidth level (Level 2) and a third bandwidth level (Level 3). The first bandwidth level is higher than the second bandwidth level, and the second bandwidth level is higher than the third bandwidth level. In the third condition judgment table, the magnitudes of the frequency of the second control signal are classified into a first frequency level (Level 1), a second frequency level (Level 2) and a third frequency level (Level 3). The first frequency level is higher than the second frequency level, and the second frequency level is higher than the third frequency level.

In other words, when the switch control circuit 121 is in the condition control mode and the charging device 1 is in the no load condition, the switch control circuit 121 uses the third condition judgment table to judge whether the load condition of the charging device 1 is maintained in the no load condition or changed to the heavy load condition or the light load condition. If the conduction current is in Level 1, the feedback current is in Level 1, the bandwidth of the second control signal is in Level 1 and the frequency of the second control signal is in Level 1, the switch control circuit 121 judges that the load condition of the charging device 1 is changed to the heavy load condition. If the conduction current is in Level 2, the feedback current is in Level 2, the bandwidth of the second control signal is in Level 2 and the frequency of the second control signal is in Level 2, the switch control circuit 121 judges that the load condition of the charging device 1 is changed to the light load condition. If the conduction current is in Level 3, the feedback current is in Level 3, the bandwidth of the second control signal is in Level 3 and the frequency of the second control signal is in Level 3, the switch control circuit 121 judges that the load condition of the charging device 1 is maintained in the no load condition. After the load condition of the charging device 1 is judged, the switch control circuit 121 selectively enables the first modulation module 122 or the second modulation module 123.

When the switch control circuit 121 is in the condition control mode and the magnitudes of the conduction current, the feedback current, the bandwidth of the second control signal and the frequency of the second control signal comply none of the heavy load condition, the light load condition and the no load condition of the third condition judgment table, the switch control circuit 121 judges that the load condition of the charging device 1 is unchanged. For example, if the conduction current is in Level 1, the feedback current is in Level 2, the bandwidth of the second control signal is in Level 3 and the frequency of the second control signal is in Level 3, the switch control circuit 121 judges that the load condition of the charging device 1 is unchanged. Under this circumstance, the operation of the switch control circuit 121 is not changed.

As mentioned above, the switch control circuit 121 enables the second modulation module 123 when the charging device 1 is in the light load condition or the no load condition. Moreover, the second modulation module 123 comprises the pulse frequency modulation circuit 1231, the amplitude modulation circuit 1232 and the green mode modulation circuit 1233. In an embodiment, an activation judgment table is previously stored in the switch control circuit 121. The activation judgment table records the relationships between the enabled circuit (e.g., the pulse frequency modulation circuit 1231, the amplitude modulation circuit 1232 or the green mode modulation circuit 1233), the parameter signals (e.g., the conduction current and the feedback current), the bandwidth of the second control signal and the frequency of the second control signal. The switch control circuit 121 uses the activation judgment table to judge which of the pulse frequency modulation circuit 1231, the amplitude modulation circuit 1232 and the green mode modulation circuit 1233 is enabled.

FIG. 6 schematically illustrating an activation judgment table in the switch control circuit. When the charging device 1 is in the light load condition or the no load condition, the switch control circuit 121 enables the second modulation module 123. Under this circumstance, the switch control circuit 121 uses the activation judgment table to determine which of the pulse frequency modulation circuit 1231, the amplitude modulation circuit 1232 and the green mode modulation circuit 1233 is enabled. In the activation judgment table, the magnitudes of the conduction current are classified into a first conduction current level (Level 1), a second conduction current level (Level 2) and a third conduction current level (Level 3). The first conduction current level is higher than the second conduction current level, and the second conduction current level is higher than the third conduction current level. In the activation judgment table, the magnitudes of the feedback current are classified into a first feedback current level (Level 1), a second feedback current level (Level 2) and a third feedback current level (Level 3). The first feedback current level is higher than the second feedback current level, and the second feedback current level is higher than the third feedback current level. In the activation judgment table, the magnitudes of the bandwidth of the second control signal are classified into a first bandwidth level (Level 1), a second bandwidth level (Level 2) and a third bandwidth level (Level 3). The first bandwidth level is higher than the second bandwidth level, and the second bandwidth level is higher than the third bandwidth level. In the activation judgment table, the magnitudes of the frequency of the second control signal are classified into a first frequency level (Level 1), a second frequency level (Level 2) and a third frequency level (Level 3). The first frequency level is higher than the second frequency level, and the second frequency level is higher than the third frequency level.

In other words, when the charging device 1 is in the light load condition or the no load condition, the switch control circuit 121 uses the activation judgment table to determine which of the pulse frequency modulation circuit 1231, the amplitude modulation circuit 1232 and the green mode modulation circuit 1233 is enabled. If the conduction current is in Level 1, the feedback current is in Level 1, the bandwidth of the second control signal is in Level 1 and the frequency of the second control signal is in Level 1, the switch control circuit 121 enables the pulse frequency modulation circuit 1231. If the conduction current is in Level 2, the feedback current is in Level 2, the bandwidth of the second control signal is in Level 2 and the frequency of the second control signal is in Level 2, the switch control circuit 121 enables the amplitude modulation circuit 1232. If the conduction current is in Level 3, the feedback current is in Level 3, the bandwidth of the second control signal is in Level 3 and the frequency of the second control signal is in Level 3, the switch control circuit 121 enables the green mode modulation circuit 1233.

In case that the magnitudes of the conduction current, the feedback current, the bandwidth of the second control signal and the frequency of the second control signal comply none of the pulse frequency modulation circuit 1231, the amplitude modulation circuit 1232 and the green mode modulation circuit 1233 of the activation judgment table, the switch control circuit 121 enables one of the pulse frequency modulation circuit 1231, the amplitude modulation circuit 1232 and the green mode modulation circuit 1233 according to the settings. For example, if the conduction current is in Level 1, the feedback current is in Level 2, the bandwidth of the second control signal is in Level 3 and the frequency of the second control signal is in Level 3, the switch control circuit 121 enables one of the pulse frequency modulation circuit 1231, the amplitude modulation circuit 1232 and the green mode modulation circuit 1233 according to the settings.

It is noted that numerous modifications and alterations may be made while retaining the teachings of the invention. For examples, in another embodiment, the conduction current, the feedback current, the bandwidth of the second control signal and the frequency of the second control signal in the activation judgment table have corresponding weights. Consequently, the switch control circuit 121 enables one of the pulse frequency modulation circuit 1231, the amplitude modulation circuit 1232 and the green mode modulation circuit 1233 according to the weighting result.

An example of the switch control circuit 121 is a UCC28610 IC. The ranges of the first conduction current level (Level 1), the second conduction current level (Level 2) and the third conduction current level (Level 3), the ranges of the first feedback current level (Level 1), the second feedback current level (Level 2) and the third feedback current level (Level 3), the ranges of the first bandwidth level (Level 1), the second bandwidth level (Level 2) and the third bandwidth level (Level 3) and the ranges of the first frequency level (Level 1), the second frequency level (Level 2) and the third frequency level (Level 3) may be set through the UCC28610 IC. The ways of setting these data are well known to those skilled in the art, and are not redundantly described herein.

Figure 7:
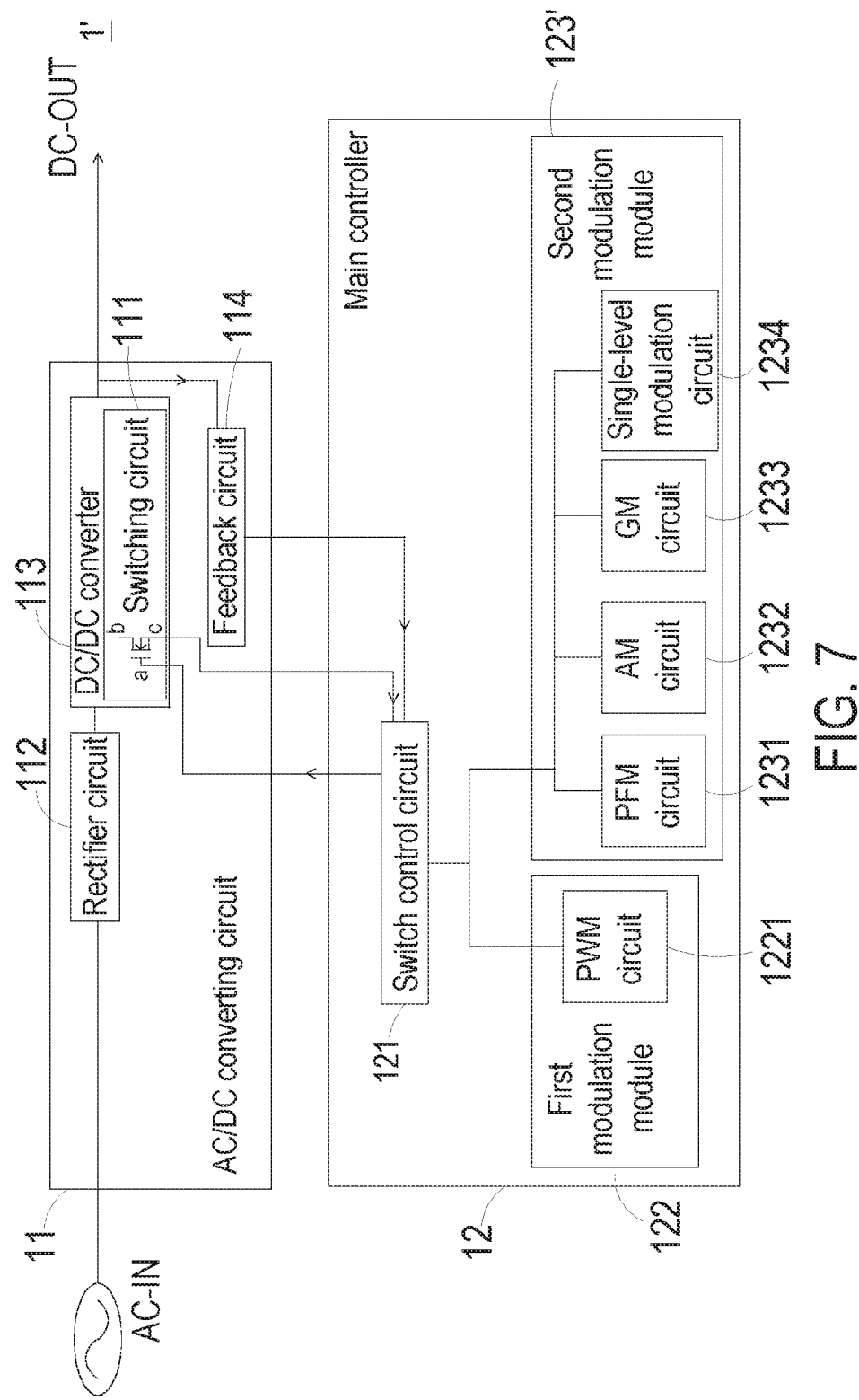
FIG. 7 is a schematic circuit diagram illustrating a charging device according to a second embodiment of the present invention.

FIG. 7 is a schematic circuit diagram illustrating a charging device according to a second embodiment of the present invention. Component parts and elements corresponding to those of the first embodiment are designated by identical numeral references, and detailed descriptions thereof are omitted. In this embodiment, the second modulation module 123' of the charging device 1' also comprises the pulse frequency modulation circuit 1231, the amplitude modulation circuit 1232 and the green mode modulation circuit 1233. In addition, the second modulation module 123' further comprises a single-level modulation circuit 1234. The single-level modulation circuit 1234 is electrically connected with the switching circuit 111. When the second modulation module 123' is enabled, the pulse frequency modulation circuit 1231, the amplitude modulation circuit 1232, the green mode modulation circuit 1233 or the single-level modulation circuit 1234 is selected to generate the second control signal. The second control signal generated by the single-level modulation circuit 1234 is a single-level signal.

When the switch control circuit 121 judges that the charging device 1 is in the heavy load condition or the light load condition, the operations of the charging device 1 are similar to those of FIGS. 3~6. When the switch control circuit 121 judges that the charging device 1 is in the no load condition, the switch control circuit 121 disables the first modulation module 122 and the pulse frequency modulation circuit 1231, the amplitude modulation circuit 1232 and the green mode modulation circuit 1233 of the second modulation module 123 but enables the single-level modulation circuit 1234. The second control signal generated by the single-level modulation circuit 1234 (i.e., the single-level signal) is transmitted to the switching circuit 111. According to the second control signal, the switching circuit 111 is alternately turned on or turned off.

Figure 8:
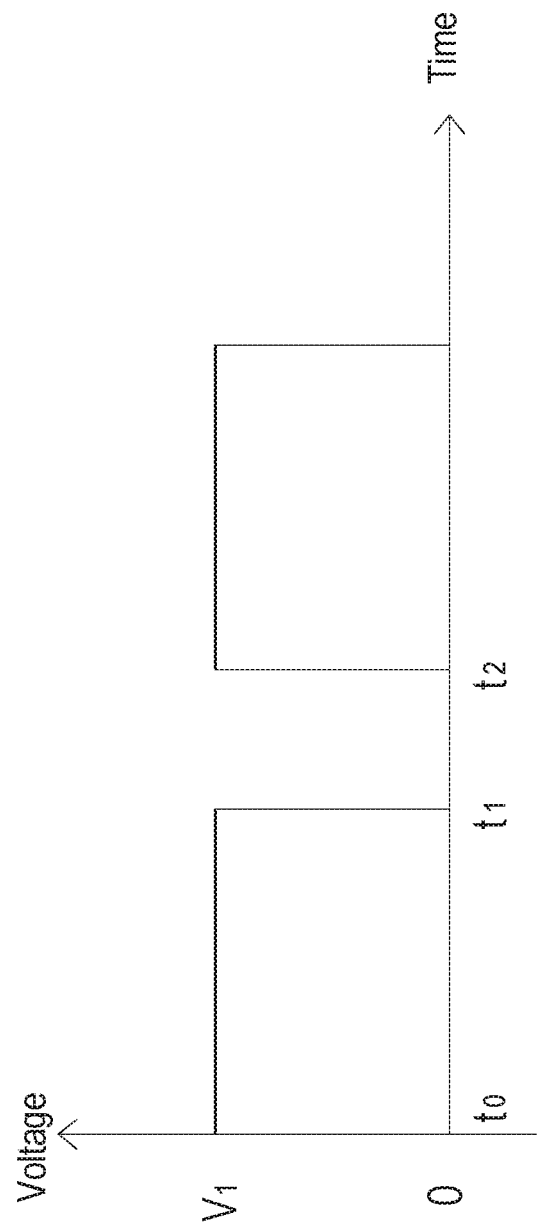
FIG. 8 is a schematic timing waveform diagram illustrating the second control signal that is generated by the single-level modulation circuit of FIG. 7.

FIG. 8 is a schematic timing waveform diagram illustrating the second control signal that is generated by the single-level modulation circuit of FIG. 7. The second control signal generated by the single-level modulation circuit 1234 is a single-level signal. In the time interval between t0 and t1, the switching circuit 111 is conducted according to the second control signal with the voltage level V1. In the time interval between t1 and t2, the switching circuit 111 is shut off according to the second control signal with the zero voltage level. As mentioned above, the switching circuit 111 is alternately conducted or shut off according to the PFM signal from the pulse frequency modulation circuit 1231, the AM signal from the amplitude modulation circuit 1232 or the GM signal from the green mode modulation circuit 1233. Since the switching circuit 111 is maintained in either the on state or the off state according to the single-level signal from the single-level modulation circuit 1234, the power consumption is further decreased. In this embodiment, the second control signal is generated by the single-level modulation circuit 1234 of the second modulation module 123 when the charging device 1 is in the no load condition. Consequently, the power consumption of the charging device in the no load condition is largely reduced.

FIG. 9 is a flowchart of a control method for a charging device according to an embodiment of the present invention. In a step S1, the charging device 1 is turned on. The operation of the switching circuit 111 is controlled according to a first control signal or a second control signal. Consequently, the AC/DC converting circuit converts an AC input power AC-IN into a DC output power DC-OUT and generates plural parameter signals corresponding to the DC output power DC-OUT. In a step S2, the switch control circuit 121 enters a condition control mode. In the condition control mode, the switch control circuit 121 judges whether a load condition of the charging device 1 is maintained in or changed to a heavy load condition, a light load condition or a no load condition according to the plural parameter signals and the first control signal or the second control signal. In a step S3, the first modulation module 122 is enabled and the second modulation module 123 is disabled if the switch control circuit 121 judges that the load condition of the charging device 1 is in the heavy load condition, and the first modulation module 122 is disabled and the second modulation module 123 is enabled if the switch control circuit 121 judges that the load condition of the charging device 1 is in the light load condition or the no load condition.

In the step S1, the switch control circuit 121 is firstly in the initial control mode. In the initial control mode, the switch control circuit 121 sets a default load condition of the charging device 1 to be one of the heavy load condition, the light load condition and the no load condition. If the default load condition of the charging device 1 is the heavy load condition, the first modulation module 122 is enabled under control of the switch control circuit 121. If the default load condition of the charging device 1 is the light load condition or the no load condition, the second modulation module 123 is enabled under control of the switch control circuit 121. During the operation of the switching circuit 111, the AC input power AC-IN is converted into the DC output power DC-OUT by the AC/DC converting circuit.

In the step S2, the switch control circuit 121 judges whether the loading condition of the charging device 1 is kept unchanged or changed. If the charging device 1 is in the heavy load condition, the switch control circuit 121 judges whether the load condition of the charging device 1 is maintained in the heavy load condition or changed to the light load condition or the no load condition according to the conduction current, the feedback current and the bandwidth of the first control signal and according to the first condition judgment table. If the conduction current is in Level 1, the feedback current is in Level 3 and the bandwidth of the first control signal is in Level 1, the switch control circuit 121 judges that the load condition of the charging device 1 is maintained in the heavy load condition. If the conduction current is in Level 2, the feedback current is in Level 2 and the bandwidth of the first control signal is in Level 2, the switch control circuit 121 judges that the load condition of the charging device 1 is changed to the light load condition. If the conduction current is in Level 3, the feedback current is in Level 1 and the bandwidth of the first control signal is in Level 3, the switch control circuit 121 judges that the load condition of the charging device 1 is changed to the no load condition.

In the step S2, if the charging device 1 is in the light load condition, the switch control circuit 121 judges whether the load condition of the charging device 1 is maintained in the light load condition or changed to the heavy load condition or the no load condition according to the conduction current, the feedback current and the frequency of the second control signal and according to the second condition judgment table. If the conduction current is in Level 1, the feedback current is in Level 3 and the frequency of the second control signal is in Level 1, the switch control circuit 121 judges that the load condition of the charging device 1 is changed to the heavy load condition. If the conduction current is in Level 2, the feedback current is in Level 2 and the frequency of the second control signal is in Level 2, the switch control circuit 121 judges that the load condition of the charging device 1 is maintained in the light load condition. If the conduction current is in Level 3, the feedback current is in Level 1 and the frequency of the second control signal is in Level 3, the switch control circuit 121 judges that the load condition of the charging device 1 is changed to the no load condition.

In the step S2, if the charging device 1 is in the no load condition, the switch control circuit 121 judges whether the load condition of the charging device 1 is maintained in the no load condition or changed to the heavy load condition or the light load condition according to the conduction current, the feedback current, the bandwidth of the second control signal and the frequency of the second control signal and according to the third condition judgment table. If the conduction current is in Level 1, the feedback current is in Level 1, the bandwidth of the second control signal is in Level 1 and the frequency of the second control signal is in Level 1, the switch control circuit 121 judges that the load condition of the charging device 1 is changed to the heavy load condition. If the conduction current is in Level 2, the feedback current is in Level 2, the bandwidth of the second control signal is in Level 2 and the frequency of the second control signal is in Level 2, the switch control circuit 121 judges that the load condition of the charging device 1 is changed to the light load condition. If the conduction current is in Level 3, the feedback current is in Level 3, the bandwidth of the second control signal is in Level 3 and the frequency of the second control signal is in Level 3, the switch control circuit 121 judges that the load condition of the charging device 1 is maintained in the no load condition.

If the switch control circuit 121 judges that the load condition of the charging device 1 is in the light load condition or the no load condition in the step S2, the following procedures are performed. That is, the switch control circuit 121 uses the activation judgment table to determine which of the pulse frequency modulation circuit 1231, the amplitude modulation circuit 1232 and the green mode modulation circuit 1233 is enabled. If the conduction current is in Level 1, the feedback current is in Level 1, the bandwidth of the second control signal is in Level 1 and the frequency of the second control signal is in Level 1, the switch control circuit 121 enables the pulse frequency modulation circuit 1231. If the conduction current is in Level 2, the feedback current is in Level 2, the bandwidth of the second control signal is in Level 2 and the frequency of the second control signal is in Level 2, the switch control circuit 121 enables the amplitude modulation circuit 1232. If the conduction current is in Level 3, the feedback current is in Level 3, the bandwidth of the second control signal is in Level 3 and the frequency of the second control signal is in Level 3, the switch control circuit 121 enables the green mode modulation circuit 1233

From the above descriptions, the present invention provides a charging device and a control method for the charging device. The charging device includes an AC/DC converting circuit and a main controller. The main controller includes a first modulation module and a second modulation module. The operation of the switching circuit controlled by the second modulation module consumes less amount of electric energy than the operation of the switching circuit controlled by the first modulation module. When the charging device is in the heavy load condition, the first modulation module is enabled to control the operation of the switching circuit. When the charging device is in the light load condition or the no load condition, the second modulation module is enabled to control the operation of the switching circuit. Consequently, the power consumption of the charging device in the light load condition or the no load condition is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A charging device, comprising:
   an AC/DC converting circuit comprising a switching circuit, wherein during an operation of the switching circuit, the AC/DC converting circuit converts an AC input power into a DC output power and generates plural parameter signals corresponding to the DC output power; and
   a main controller electrically connected with the AC/DC converting circuit for controlling the AC/DC converting circuit, wherein the main controller comprises a switch control circuit, a first modulation module and a second modulation module, wherein the first modulation module generates a first control signal to control the switching circuit when the first modulation module is enabled, the second modulation module generates a second control signal to control the switching circuit when the second modulation module is enabled, a first end of the switch control circuit is electrically connected with the switching circuit, a second end of the switch control circuit is electrically connected with the first modulation module and the second modulation module, and the switch control circuit selectively enables the first modulation module or the second modulation module to generate the first control signal or the second control signal to the switching circuit, wherein the operation of the switching circuit according to the second control signal consumes less amount of electric energy than the operation of the switching circuit according to the first control signal,
   wherein when the switch control circuit is operated in a condition control mode, the switch control circuit judges whether a load condition of the charging device is maintained in or changed to a heavy load condition, a light load condition or a no load condition according to the plural parameter signals and the first control signal or the second control signal, wherein if the switch control circuit judges that the load condition of the charging device is in the heavy load condition, the switch control circuit enables the first modulation module and disables the second modulation module, wherein if the switch control circuit judges that the load condition of the charging device is in the light load condition or the no load condition, the switch control circuit disables the first modulation module and enables the second modulation module.

2. The charging device according to claim 1, wherein after the charging device is turned on, the switch control circuit is operated in an initial control mode, and the switch control circuit sets a default load condition of the charging device to be one of the heavy load condition, the light load condition and the no load condition, wherein if the default load condition of the charging device is the heavy load condition, the switch control circuit enables the first modulation module to generate the first control signal and acquires information about a bandwidth and a frequency of the first control signal, wherein if the default load condition of the charging device is the light load condition or the no load condition, the switch control circuit enables the second modulation module to generate the second control signal and acquires information about a bandwidth of the second control signal and a frequency of the second control signal.

3. The charging device according to claim 2, wherein the switching circuit comprises a transistor, and the switching circuit comprises a control terminal, a first conduction terminal and a second conduction terminal, wherein the control terminal is electrically connected with the switch control circuit for receiving the first control signal or the second control signal, and a path between the first conduction terminal and the second conduction terminal is conducted or shut off according to the first control signal or the second control signal, wherein when the path between the first conduction terminal and the second conduction terminal is conducted, a conduction current flows through the first conduction terminal and the second conduction terminal.

4. The charging device according to claim 3, wherein the AC/DC converting circuit further comprises a feedback circuit, and the feedback circuit is electrically connected with the switch control circuit and the AC/DC converting circuit, wherein when AC/DC converting circuit outputs the DC output power, a feedback current corresponding to the DC output power DC-OUT is outputted from the feedback circuit to the switch control circuit.

5. The charging device according to claim 4, wherein the plural parameter signals include the conduction current and the feedback current.

6. The charging device according to claim 5, wherein if the switch control circuit is in the condition control mode and the charging device is in the heavy load condition, the switch control circuit judges whether the load condition of the charging device is maintained in the heavy load condition or changed to the light load condition or the no load condition according to the conduction current, the feedback current and the bandwidth of the first control signal and according to a first condition judgment table in the switch control circuit, wherein if the switch control circuit is in the condition control mode and the charging device is in the light load condition, the switch control circuit judges whether the load condition of the charging device is maintained in the light load condition or changed to the heavy load condition or the no load condition according to the conduction current, the feedback current and the frequency of the second control signal and according to a second condition judgment table in the switch control circuit, wherein if the switch control circuit is in the condition control mode and the charging device is in the no load condition, the switch control circuit judges whether the load condition of the charging device is maintained in the no load condition or changed to the heavy load condition or the light load condition according to the conduction current, the feedback current, the bandwidth of the second control signal and the frequency of the second control signal and according to a third condition judgment table in the switch control circuit.

7. The charging device according to claim 6, wherein the first condition judgment table records relationships between the load condition of the charging device, the conduction current, the feedback current and the bandwidth of the first control signal, and the switch control circuit uses the first condition judgment table to judge whether the load condition of the charging device is maintained in the heavy load condition or changed to the light load condition or the no load condition.

8. The charging device according to claim 6, wherein the second condition judgment table records relationships between the load condition of the charging device, the conduction current, the feedback current and the frequency of the second control signal, and the switch control circuit uses the first condition judgment table to judge whether the load condition of the charging device is maintained in the light load condition or changed to the heavy load condition or the no load condition.

9. The charging device according to claim 6, wherein the third condition judgment table records relationships between the load condition of the charging device, the conduction current, the feedback current, the bandwidth of the second control signal and the frequency of the second control signal, and the switch control circuit uses the first condition judgment table to judge whether the load condition of the charging device is maintained in the no load condition or changed to the heavy load condition or the light load condition.

10. The charging device according to claim 6, wherein the first modulation module comprises a pulse width modulation circuit, and the pulse width modulation circuit is electrically connected with the switch control circuit to generate the first control signal, wherein the first control signal is a pulse width modulation signal.

11. The charging device according to claim 6, wherein the second modulation module comprises a pulse frequency modulation circuit, an amplitude modulation circuit and a green mode modulation circuit, which are electrically connected with the switch control circuit to generate the second control signal, wherein the second control signal generated by the pulse frequency modulation circuit is a pulse frequency modulation signal, the second control signal generated by the amplitude modulation circuit is an amplitude modulation signal, and the second control signal generated by the green mode modulation circuit is a green mode modulation signal.

12. The charging device according to claim 11, wherein when the charging device is in the light load condition or the no load condition, the switch control circuit updates the second control signal according to the conduction current, the feedback current, the bandwidth of the second control signal and the frequency of the second control signal and according to an activation judgment table in the switch control circuit.

13. The charging device according to claim 12, wherein the activation judgment table records relationships between an enabled circuit of the second modulation module, the conduction current, the feedback current, the bandwidth of the second control signal and the frequency of the second control signal, and the switch control circuit determines which of the pulse frequency modulation circuit, the amplitude modulation circuit and the green mode modulation circuit is enabled according to the activation judgment table.

14. The charging device according to claim 11, wherein the second modulation module further comprises a single-level modulation circuit, and the single-level modulation circuit is electrically connected with the switch control circuit, wherein when the charging device is in the no load condition, the switch control circuit enables the single-level modulation circuit to generate the second control signal, wherein the second control signal is a single-level signal.

15. A control method for a charging device, the charging device comprising an AC/DC converting circuit and a main controller, the AC/DC converting circuit comprising a switching circuit, the main controller being electrically connected with the AC/DC converting circuit, the main controller comprising a switch control circuit, a first modulation module and a second modulation module, the first modulation module generating a first control signal to control an operation of the switching circuit when the first modulation module is enabled, the second modulation module generating a second control signal to control the operation of the switching circuit when the second modulation module is enabled, the control method comprising steps of:
    (a) controlling the operation of the switching circuit according to the first control signal or the second control signal, so that the AC/DC converting circuit converts an AC input power into a DC output power and generates plural parameter signals corresponding to the DC output power;
    (b) allowing the switch control circuit to enter a condition control mode, wherein in the condition control mode, the switch control circuit judges whether a load condition of the charging device is maintained in or changed to a heavy load condition, a light load condition or a no load condition according to the plural parameter signals and the first control signal or the second control signal; and (c) enabling the first modulation module and disabling the second modulation module if the switch control circuit judges that the load condition of the charging device is in the heavy load condition, and disabling the first modulation module and enabling the second modulation module if the switch control circuit judges that the load condition of the charging device is in the light load condition or the no load condition.

* * * * *